(12) United States Patent
Tal

(10) Patent No.: US 6,535,856 B1
(45) Date of Patent: Mar. 18, 2003

(54) SYSTEM, METHODS AND SOFTWARE FOR DYNAMICALLY REGULATING AND ENFORCING OPEN ACCOUNT PAYMENTS AND FOR DYNAMIC UPDATING OF CREDIT RATINGS

(76) Inventor: Peter Tal, 57 Netto La., Plainview, NY (US) 11803

( * ) Notice: Subject to any disclaimer, the term of this patent is extended or adjusted under 35 U.S.C. 154(b) by 0 days.

(21) Appl. No.: 09/386,018

(22) Filed: Aug. 30, 1999

(51) Int. Cl.[7] ............................................. G06F 17/60
(52) U.S. Cl. ....................................................... 705/1
(58) Field of Search .............................. 705/1, 75, 78, 705/80, 17

(56) References Cited

U.S. PATENT DOCUMENTS

| | | | |
|---|---|---|---|
| 5,732,400 A | | 3/1998 | Mandler .................. 705/26 |
| 5,794,210 A | * | 8/1998 | Goldhaber et al. |
| 5,862,325 A | * | 1/1999 | Reed et al. |
| 5,974,406 A | * | 10/1999 | Bisdikian et al. |
| 6,052,674 A | * | 4/2000 | Zervides et al. |
| 6,233,566 B1 | * | 5/2001 | Levine et al. |
| 2001/0005829 A1 | * | 6/2001 | Raveis, Jr. |
| 2001/0051884 A1 | * | 12/2001 | Wallis et al. |
| 2001/0056395 A1 | * | 12/2001 | Khan |

* cited by examiner

Primary Examiner—John G. Weiss
Assistant Examiner—Kevin Saunders
(74) Attorney, Agent, or Firm—David P. Gordon; David S. Jacobson; Thomas A. Gallagher

(57) ABSTRACT

Methods and software of the present invention include maintaining a database of buyers and sellers, updating the database with information from sellers about buyers who have defaulted on payment terms, processing data about buyers who have defaulted on payment terms, notifying the buyer(s) who have defaulted of a time to cure the default, determining when a buyer fails to cure a default in time, and notifying all sellers who sell to the buyer who failed to cure the default that the buyer failed to cure the default. According to another embodiment, sellers are classified according to the types of goods/services which they sell and when a buyer fails to cure a default all sellers in the same class as the seller which was party to the default are notified. According to another embodiment, all members in the system may obtain information about any other member in the system prior to doing business with the other member. Individual members of the system may be at once both a buyer and a seller, e.g. a manufacturer who buys materials from a supplier and sells a product to a retailer. Further, the methods and software according to the invention may be broadly applied to enforce performance, e.g. where a buyer has paid a seller and the seller has failed to deliver the goods or service properly.

19 Claims, 5 Drawing Sheets

SYSTEM, METHODS AND SOFTWARE FOR DYNAMICALLY REGULATING AND ENFORCING OPEN ACCOUNT PAYMENTS AND FOR DYNAMIC UPDATING OF CREDIT RATINGS

BACKGROUND OF THE INVENTION

1. Field of the Invention

The invention relates to systems for regulating and enforcing open account payments. More particularly, the invention relates to methods and software for dynamically regulating and enforcing open account payments and for dynamic updating of credit ratings.

2. State of the Art

Business-to-business sales transactions are based on oral or written agreements between the buyer and the seller dictating the terms of the sale, e.g., the purchase price, the delivery date, the date by which payment must be received. It is common for the seller to extend credit to the buyer so that payment is not due until some time after the delivery of goods or services. This line of credit is often referred to as an "open account trade credit" or simply an "open account" and usually works well between regular trading partners who have established credit worthiness. In commerce between a buyer who is unknown to the seller, trading with an open account incurs substantial risk on the part of the seller. The risk is essentially related to the buyer's ability and/or willingness to meet the payment terms of the sales agreement. For this reason, there are many commercial credit reporting agencies such as TRW, EQUIFAX, and Dun & Bradstreet which provide information about the credit worthiness of businesses. Nevertheless, when dealing with an unknown buyer, the seller must undertake to obtain credit rating information about the buyer, analyze the information, decide whether to deal with the buyer, and adjust the selling price based on the degree of risk which is expected based on the credit report.

U.S. Pat. No. 5,732,400 to Mandler et al. ("the '400 patent") discloses a system and method for enabling on-line transactional services among sellers and buyers having no previous relationship with each other. The system includes a financial clearinghouse for receiving a request for goods or services from a buyer and making a real-time determination of a risk classification of the buyer utilizing an on-line repository of credit information. The financial clearinghouse determines a risk-based discount fee as a function of the buyer's risk classification in order to establish a payment amount to the seller from the clearinghouse. If the transaction is authorized by the financial clearinghouse, the financial clearinghouse transmits the payment amount to the seller and transmits an invoice to the buyer for the purchase price of the transaction. The system can also include a broker coupled to the financial clearinghouse for providing an on-line order acceptance and processing capability between the buyers and sellers. The system attempts to facilitate the process of credit analysis and pricing based on credit worthiness. It does not reduce the risk involved in selling to a particular buyer, but simply provides a more efficient estimate of the risk.

Even with the most careful analysis, the seller always bears some risk that the buyer will default on the payment promise. When this happens, the seller must engage the services of a collection agency or an attorney. Depending on the amount in controversy, expensive litigation must be undertaken. Moreover, even after substantial expenditures toward collecting the debt, the seller may be forced to accept an amount far less than the original selling price. This ultimate risk, even after careful analysis, may never be known if the credit information about the buyer is stale. Although the '400 patent discloses that the system provides a "real-time determination of a risk classification of a buyer using an on-line repository of credit information", there is no teaching of how frequently (or through what mechanism) credit information is updated. Moreover, there is no teaching in the '400 patent about collecting payment from a buyer who is in default.

SUMMARY OF THE INVENTION

It is therefore an object of the invention to provide methods for regulating and enforcing open account payments.

It is also an object of the invention to provide software for regulating and enforcing open account payments.

It is another object of the invention to provide methods and software for dynamic updating of buyer credit ratings.

It is also an object of the invention to provide methods and software for dynamic updating of seller performance ratings.

It is still another object of the invention to provide an index to buyers and sellers so that alternates sources can be found.

It is also an object of the invention to provide methods and software for automatically notifying a seller of a change in the financial condition of a buyer.

It is another object of the invention to provide methods and software for restructuring debts of a defaulting buyer.

In accord with these objects which will be discussed in detail below, the methods and software of the present invention include maintaining a database of buyers and sellers, updating the database with information from sellers about buyers who have defaulted on payment terms, processing data about buyers who have defaulted on payment terms, notifying the buyer(s) who have defaulted of a time to cure the default, determining when a buyer fails to cure a default in time, and notifying all sellers who sell to the buyer who failed to cure the default that the buyer failed to cure the default. According to an alternate embodiment of the invention, sellers are classified according to the types of goods/services which they sell and when a buyer fails to cure a default all sellers in the same class as the seller which was party to the default are notified. According to another alternate embodiment, all members in the system may obtain information about any other member in the system prior to doing business with the other member. As contemplated by the invention, individual members of the system may be at once both a buyer and a seller, e.g., a manufacturer who buys materials from a supplier and sells a product to a retailer. Further, although initially directed at enforcing payment, it will be appreciated that the methods and software according to the invention may be broadly applied to enforce performance, e.g. where a buyer has paid a seller and the seller has failed to deliver the goods or service properly.

According to other aspects of the invention, transactions are recorded with SIC codes or international customs codes so that alternate sources of goods and services may be found by users of the system. Disputes between parties are also classified so that members of the system may make dealing decisions based on the types of disputes in which a party has been involved. Users of the system may subscribe to be automatically notified of a change in the financial status of a party with whom they deal.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
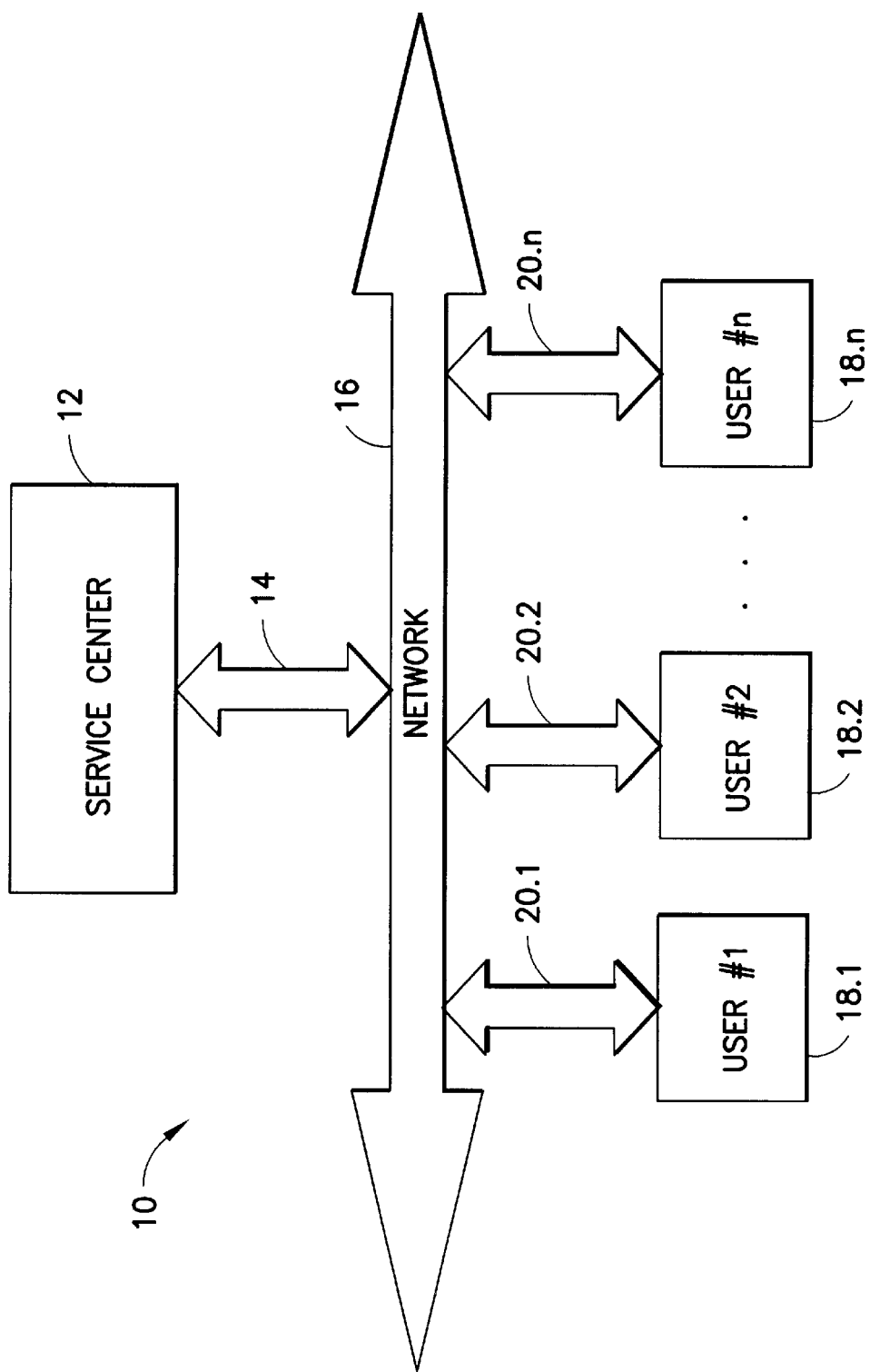
FIG. 1 is a high level schematic diagram of a system for implementing the methods and software of the invention.
Figure 2:
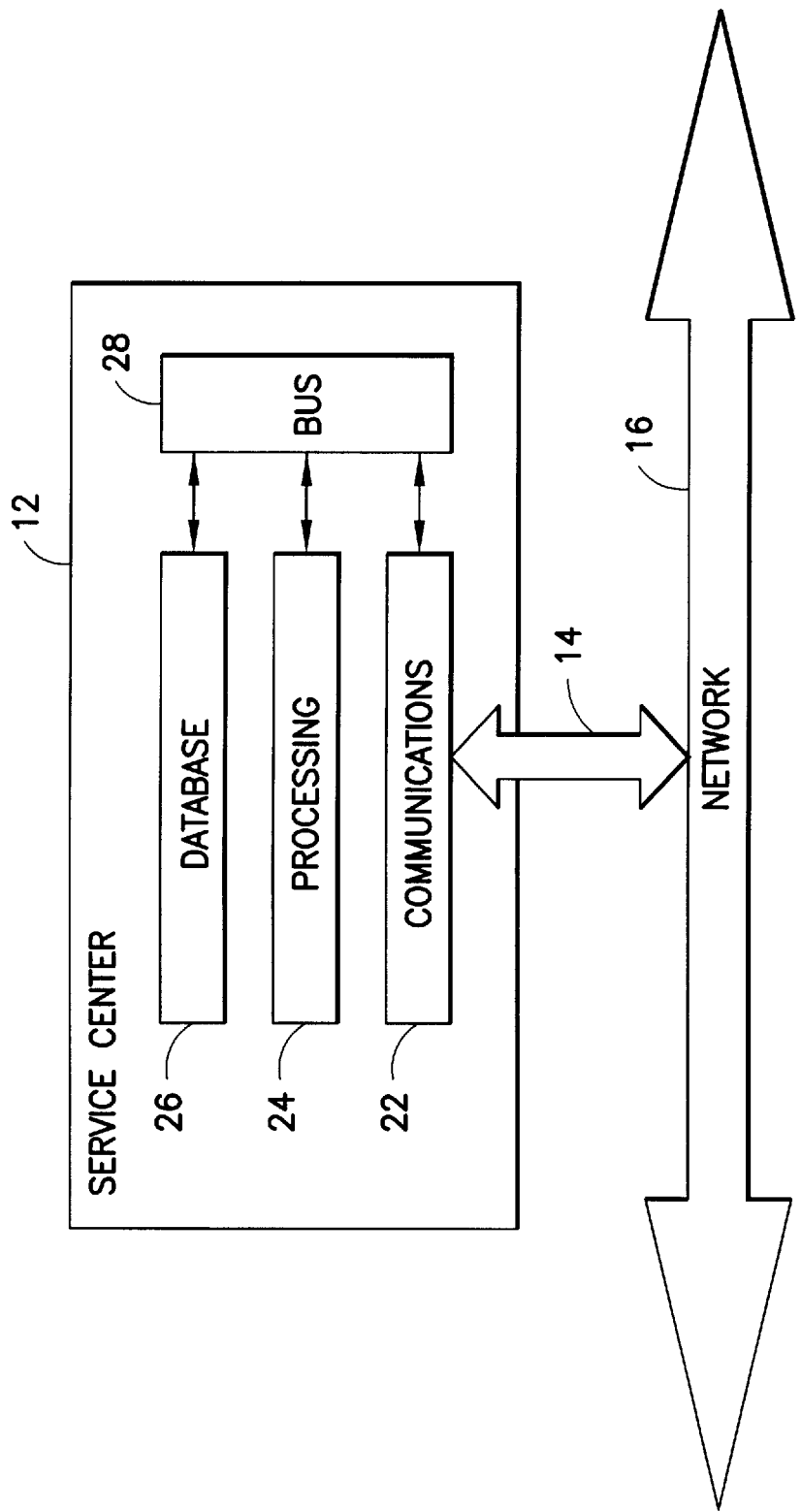
FIG. 2 is a high level schematic diagram of the service center of FIG. 1.
Figure 3:
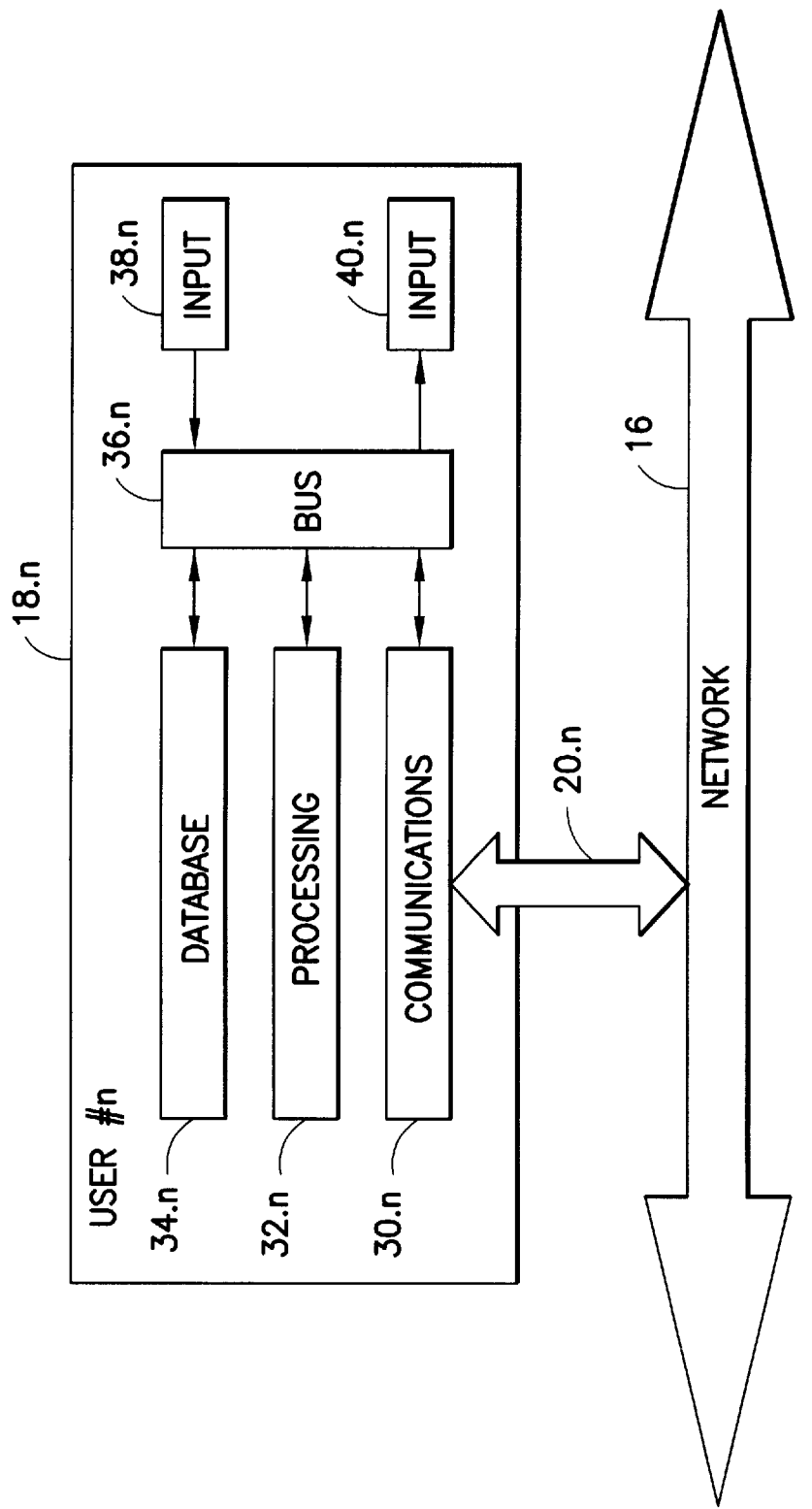
FIG. 3 is a high level schematic diagram of the user device of FIG. 1.

Referring now to FIGS. 1 through 3, a system 10 for implementing the methods and software of the invention includes a service center 12 which is coupled by a data link 14 to a network 16, and a plurality of user devices 18.1, 18.2, . . . , 18.n which are respectively coupled by data links 20.1, 20.2, . . . , 20.n to the network 16. The service center 12 is preferably implemented as a "server" computer such as an IBM AS/400. The data link 14 is preferably a broadband digital link such as a T1 or T3 link in order to accommodate a large number of simultaneous users. The network 16 is preferably a public or private PSTN or ATM network. The user devices 18.1, 18.2, . . . , 18.n may be personal computers or communications terminals which are dedicated to exchanging information with the service center. Alternatively, and preferably, the user devices are integrated with the user's general accounting system so that data regarding delinquent accounts is automatically transmitted to the service center. The individual user data links 20.1, 20.2, . . . , 20.n need not be very broadband and an ordinary analog modem will suffice since the amount of data exchanged between the service center 12 and an individual user during a single session is not very large.

An exemplary service center 12 is illustrated in FIG. 2 and includes a communications module 22, a processing module 24, and a database 26. The communications module 22 preferably includes one or more "cards" which couple the service center 12 to the network 16 via the data link(s) 14. The processing module 24 preferably includes one or more "daughter boards" each bearing a microprocessor and associated circuits. The database memory 26 preferably resides on at least two non-volatile memory devices (one being a mirror backup of the other) such as magnetic hard disks, optical disks, or magneto-optical disks. The communications card(s) 22, the processor(s) 24, and the memory devices 26 are preferably coupled by a bus 28 such as a PCI bus. The service center 12 may also include local input/output devices, (not shown) for programming and maintenance.

An exemplary user device 18.n is illustrated in FIG. 3 and includes a communications module 30.n, a processing module 32.n, and a database memory 34.n. The communications module 30.n is preferably an analog modem which couples the user device to the network 16 via the data link 20.n. The processing module 32.n preferably includes a single microprocessor and associated circuits. The database memory 34.n preferably resides on at least one non-volatile memory device such as one or more magnetic hard disks, optical disks, or magneto-optical disks which is preferably backed up regularly onto removable media (not shown). The modem 30.n, microprocessor 32.n, and the memory device 34.n are preferably coupled by a bus 36.n such as a PCI bus. The user device preferably includes an input device 38.n, typically a keyboard and mouse, and output devices 40.n, typically a monitor and a printer. Those skilled in the art will appreciate that the user device could be a dedicated terminal or a PC connected to a LAN having a server. Moreover, as will be appreciated from the following discussion, the user device could be a LAN server which is programmed to communicate automatically with the service center at regular intervals.

It is preferable that the system of the invention operate a seamlessly as possible with existing accounting systems. Therefore, when a member joins the system, the system will first determine a communication protocol and information exchange method. For example, one method of communication may include a nightly data dump of updated accounting information in the form of a delimited text file. It is also preferable that the system maintain high security procedures including for example electronic signatures.

Figure 4:
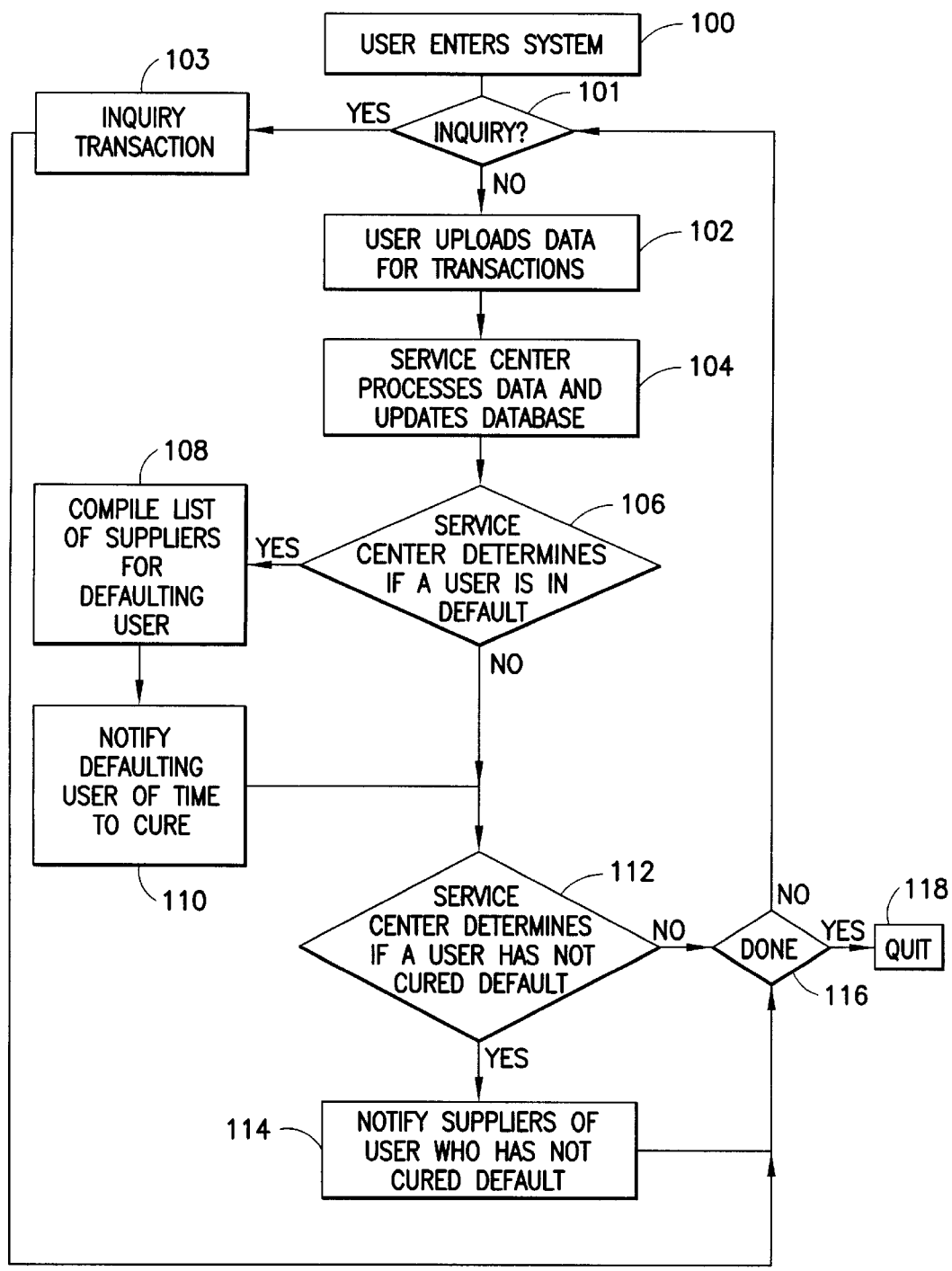
FIG. 4 is a high level flow chart illustrating a first aspect of the invention.

Turning now to FIG. 4, some of the methods of the invention are illustrated with reference to a flow chart. It will be appreciated that the methods of the invention are preferably embodied in software used in conjunction with the processors described above. As shown in FIG. 4 at 100, a user (member) enters the system. Upon entering the system, the system determines at 101 whether the user is making an inquiry or uploading new accounting data. If it is determined at 101 that the user is making an inquiry, an inquiry transaction takes place at 103. An inquiry transaction would typically be a request for credit information about another member of the system, but as described below, may include requests for other information as well. After the transaction at 103, the system determines at 116 whether the user is done and, if so, quits the session at 118. If the user has another transaction to complete, the system returns to 101 to determine whether the transaction is an inquiry.

If the transaction is not an inquiry, but is rather a data upload, the user enters data at 102. Initially, the data will include identification data to identify the user. Subsequently, the data will include information about transactions between the user and other members of the system such as whether a seller has properly delivered goods or services to the user or whether a buyer has made payment according to agreed terms. The data entered by the user is processed at 104. If the data entered is in the nature of a dispute with another member, the processing of the data will include categorizing the type of dispute. In all cases, the processing of data preferably includes identifying the parties to the transaction, identifying the type of transaction including the SIC codes or other codification of the type of goods/services involved.

According to one of the methods of the invention, the service center determines at 106 whether any users are in default with regard to a transaction in the database. If users are in default, the processing center compiles a list for each defaulting user of the suppliers to the defaulting user at 108. Optionally, according to another method of the invention, the service center will compile a list of all users who have dealings with the defaulting user and/or all users who have indicated to the service center that they want to be updated about the defaulting user. At 110, the service center notifies the defaulting user of a set time to cure the default. According to a presently preferred embodiment, notification is by electronic mail, by overnight mail, by voice mail, by fax, or by a combination of these media.

The time to cure default may be part of the agreed terms of the original transaction upon which the default is based. Optionally, the time to cure the default may be set system wide for all users or may be based on a user's credit rating or other information. If it is determined at 112 that no users have failed to cure default within the allowed time, it is determined at 116 whether additional data processing remains to be done. If the processing is done, the system quits at 118, e.g. the user is logged off.

If it is determined at 112 that some user(s) have not cured their default, the service center notifies, at 114, all the suppliers of the user(s) who has not cured default. According to a presently preferred embodiment, notification is by electronic mail, by overnight mail, by voice mail, by fax, or by a combination of these media. After notification, it is determined at 116 whether additional transactions remain. If the user is done, the system quits at 118, e.g. the user is logged off.

Figure 5:
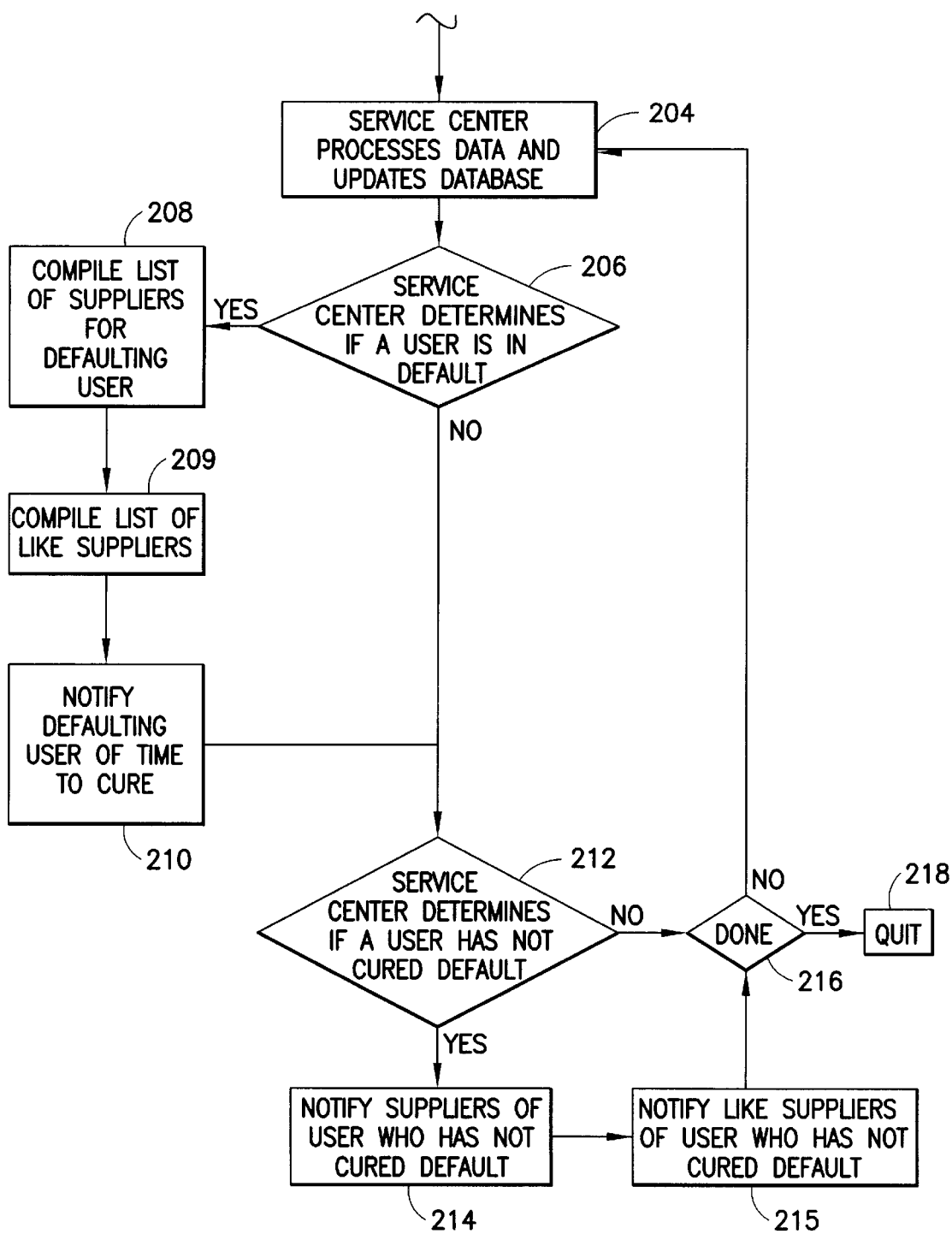
FIG. 5 is a high level flow chart illustrating a second aspect of the invention.

FIG. 5 shows an additional method of the invention which includes similar steps having similar reference numerals (increased by 100). Here, additional method steps are shown at 209 and 215. These steps include compiling lists of "like suppliers" at 209 and notifying these suppliers at 215. As mentioned above, this step may include notifying all suppliers which the defaulting user might contact as a substitute for the supplier involved in the original transaction upon which the default is based. Further, the additional users listed in step 209 and notified in step 215 may be users who have indicated to the service center that they want to be notified about this particular user when a default is not cured.

As mentioned above, all defaults and disputes remain in the database unless cured in the given time. The record of defaults and disputes are indexed according to parties involved, type of transaction (including SIC codes or similar identifying codes), type of dispute or default (e.g. late payment, late delivery, short delivery, non-payment, delivery of defective goods, incompletion of services, etc.) All users (or users who have paid for the privilege) have access to the database of disputes and defaults and can use that information when deciding whether to deal with another user of the system. Since the information in the database is updated in real time, the database provides a dynamically updated credit rating system which can be used by members to dynamically regulate commerce among members and to dynamically enforce payment of open accounts.

There have been described and illustrated herein several embodiments of a system, methods and software for dynamically regulating and enforcing open account payments and for dynamic updating of credit ratings. While particular embodiments of the invention have been described, it is not intended that the invention be limited thereto, as it is intended that the invention be as broad in scope as the art will allow and that the specification be read likewise. Thus, while particular hardware have been disclosed, it will be appreciated that other hardware could be utilized to implement the systems and methods disclosed. Also, while particular method steps have been shown in a particular order, it will be recognized that additional method steps could be added and that the order of some steps is not critical. Further, it will be appreciated that the system can provide information to members such as the credit rating of non-members via conventional sources. In addition, it will be appreciated that the members may be either corporations, unincorporated organizations, or individuals. Members may even be banks which use the system to assess the credit worthiness of clients seeking loans or credit lines. It will therefore be appreciated by those skilled in the art that yet other modifications could be made to the provided invention without deviating from its spirit and scope as so claimed.

What is claimed is:

1. Method for dynamically enforcing open account payments, comprising:

a) maintaining a database of buyers and sellers;

b) updating the database with information from sellers about buyers who have defaulted on payment terms;

c) processing data about buyers who have defaulted on payment terms;

d) notifying the buyers who have defaulted of a time to cure the default;

e) determining when a buyer fails to cure a default in time;

f) notifying at least one other seller who sells to the buyer who failed to cure the default that the buyer failed to cure the default;

g) updating the database with information from buyers about sellers who have defaulted on delivery terms;

h) processing data about sellers who have defaulted on delivery terms;

i) notifying the sellers who have defaulted of a time to cure the default;

j) determining when a seller fails to cure a default in time; and k) notifying at least one other buyer who buys from the seller who failed to cure the default that the seller failed to cure the default.

2. A method according to claim 1, wherein:

said step of notifying at least one other seller who sells to the buyer who failed to cure the default that the buyer failed to cure the default includes notifying a plurality of other sellers who sell to the buyer who failed to cure the default that the buyer failed to cure the default.

3. A method according to claim 1, wherein:

said step maintaining a database of buyers and sellers includes maintaining an indication of the types of goods/services sold by sellers.

4. A method according to claim 3, wherein:

said step of notifying at least one other seller who sells to the buyer who failed to cure the default that the buyer failed to cure the default includes notifying other sellers who sell the same type of goods/services to the buyer who failed to cure the default that the buyer failed to cure the default.

5. A method according to claim 1, wherein:

said step of notifying at least one other buyer who buys from the seller who failed to cure the default that the seller failed to cure the default includes notifying a plurality of other buyers who buy from the seller who failed to cure the default that the seller failed to cure the default.

6. A method according to claim 1, wherein:

said step maintaining a database of buyers and sellers includes maintaining an indication of the types of goods/services bought by buyers.

7. A method according to claim 6, wherein:

said step of notifying at least one other buyer who buys from the seller who failed to cure the default that the seller failed to cure the default includes notifying other buyers who buy the same type of goods/services from the seller who failed to cure the default that the seller failed to cure the default.

8. A method according to claim 1, wherein:

said step of updating includes updating the status of disputes between buyers and sellers.

9. A method according to claim 1, wherein:

l) providing access to the database to member banks so that member banks can assess the creditworthiness of buyers and sellers.

10. A method according to claim 1, wherein:

the buyers include individuals and the sellers include one of lending institutions and utility providers.

11. A system for dynamically enforcing open account payments, comprising:

a) a database of buyers and sellers;

b) updating means for updating the database with information from sellers about buyers who have defaulted on payment terms;

c) determining means for determining when a buyer fails to cure a default within a set time; and d) notifying means for notifying the buyers who have defaulted of the set time to cure the default and for notifying at least one other seller who sells to the buyer who failed to cure the default that the buyer failed to cure the default, wherein said updating means includes means for updating the database with information from buyers about sellers who have defaulted on delivery terms;

said determining means includes means for determining when a seller fails to cure a default in time; and said notifying means includes means for notifying the sellers who have defaulted of a time to cure the default and for notifying at least one other buyer who buys from the seller who failed to cure the default that the seller failed to cure the default.

12. A system according to claim 11, wherein:

said notifying means includes means for notifying a plurality of other sellers who sell to the buyer who failed to cure the default that the buyer failed to cure the default.

13. A system according to claim 11, wherein:

said database of buyers and sellers includes an indication of the types of goods/services sold by sellers.

14. A system according to claim 13, wherein:

said notifying means includes means for notifying other sellers who sell the same type of goods/services to the buyer who failed to cure the default that the buyer failed to cure the default.

15. A system according to claim 12, wherein:

said notifying means includes means for notifying a plurality of other buyers who buy from the seller who failed to cure the default that the seller failed to cure the default.

16. A system according to claim 12, wherein:

said database of buyers and sellers includes an indication of the types of goods/services bought by buyers.

17. A system according to claim 16, wherein:

said notifying means includes means for notifying other buyers who buy the same type of goods/services from the seller who failed to cure the default that the seller failed to cure the default.

18. A system according to claim 11, wherein:

said updating means includes means for updating the status of disputes between buyers and sellers.

19. A system according to claim 11, further comprising:

e) terminal means for remotely interrogating said database.

* * * * *